United States Patent [19]

Shinzawa et al.

[11] Patent Number: 4,881,501
[45] Date of Patent: Nov. 21, 1989

[54] DIESEL ENGINE HAVING SHAPED FLAME DISPERSING RECESS IN PISTON CROWN

[75] Inventors: Motohiro Shinzawa, Yokosuka; Yoshiki Sekiya, Yokohama, both of Japan

[73] Assignee: Nissan Motor Co., Ltd., Yokohama, Japan

[21] Appl. No.: 304,076

[22] Filed: Jan. 31, 1989

[30] Foreign Application Priority Data

Feb. 3, 1988 [JP] Japan .................................. 63-23388

[51] Int. Cl.⁴ ................................................ F02F 3/26
[52] U.S. Cl. .................................. 123/279; 123/193 P
[58] Field of Search ......... 123/193 P, 193 R, 193 CP, 123/279, 285

[56] References Cited

U.S. PATENT DOCUMENTS

| 4,166,436 | 9/1979 | Yamakawa | 123/193 P |
| 4,453,527 | 6/1984 | Wade | 123/193 P |
| 4,662,330 | 5/1987 | Shioyama et al. | 123/269 |
| 4,669,431 | 6/1987 | Simay | 123/193 P |
| 4,798,183 | 1/1989 | Hataura et al. | 123/193 P |

FOREIGN PATENT DOCUMENTS

| 56-54229 | 5/1981 | Japan . | |
| 57-126526 | 8/1982 | Japan . | |
| 0035223 | 3/1983 | Japan | 123/193 P |
| 61-91029 | 6/1986 | Japan . | |
| 0129550 | 6/1987 | Japan | 123/193 P |

Primary Examiner—David A. Okonsky
Attorney, Agent, or Firm—Foley & Lardner, Schwartz, Jeffery, Schwaab, Mack, Blumenthal & Evans

[57] ABSTRACT

The major portion of a flame which ejects from a swirl chamber by way of a transfer passage, is subject to first and second deflections. The first occurs close to TDC, the second after the piston has decended a predetermined amount. A minor portion of the flame which tends to flow in a direction essentially the reverse of the main one, encounters a curved deflection wall portion and is thereafter subject to guidance by guide members which induce the flame to blend with the air located proximate the location of the transfer passage opens into the combustion chamber. A variation of the basic arrangement includes the provision of a squish generating projection which promotes suitable mixing turbulence near the curved deflection wall portion.

12 Claims, 3 Drawing Sheets

DIESEL ENGINE HAVING SHAPED FLAME DISPERSING RECESS IN PISTON CROWN

RELATED APPLICATIONS

United States Patent application U.S. Pat. No. 080,508 filed on July 24, 1897 in the name of TOKURA et al, now in condition for allowance.

BACKGROUND OF THE INVENTION

1. Field of the Invention

The present invention relates generally to a diesel engine and more specifically to a swirl or prechamber type diesel engine featuring a piston crown cavity which improves dispersion and mixing of the flame which is ejected from the swirl chamber.

2. Description of the Prior Art

FIG. 1 shows a so called "clover leaf" type flame dispersing cavity or recess arrangement 1 which is used in combination with swirl or pre-chamber type diesel engines such as disclosed in disclosed in Japanese Utility Model pre-publications Nos. 57-174725, 57-97123 and 58-8715.

With this type of engine, in order to lower the peak combustion temperature in the swirl chamber 2 and thus reduce the amount of NOx produced, a fraction of the injected fuel is released into the main combustion chamber prior spontaneous combustion of the main airfuel charge in the swirl chamber.

However, in the absence of any strong turbulence or other mixing influence in the main combustion chamber, most of the fuel which is permitted to escape into the main combustion chamber via a transfer passage 3 tends to remain in or close to the trench portion 4 of the cavity. As the cavity 1 exerts only relatively weak dispersive influences on the flame which is ejected into the trench portion, it tends to flow up and over the rounded nose portion 5 of the clover leaf type dispersion recess located opposite the trench 3. This induces the situation wherein the fuel in trench portion tends to be entrained in a flame plume P having a shape essentially as illustrated by the broken or chain line.

Under these conditions the fuel which is released into the main combustion chamber tends to be carried by the initial flame ejection into a relatively cool section of the combustion chamber.

Accordingly, the relatively rich flame and the entrained fuel (particularly the latter) are not mixed effectively with the air which is available in the main combustion chamber and neither tend to undergo sufficiently rapid and complete combustion to enable good engine output and low noxious emissions.

As a result of this problem, during low load engine operation high HC exhaust emissions result while under high load smoke formation tends to be excessive.

SUMMARY OF THE INVENTION

It is an object of the present invention to provide an arrangement which promotes rapid spreading and blending of the flame which ejects from a diesel swirl or prechamber with the air and/or fuel in the associated main combustion chamber in a manner which promotes more efficient combustion and thus reduces smoke and HC emmissions. This object further includes promoting the use of the air which is located beside and to the rear of the transfer passage which interconnects the main and swirl chambers and generally out of the path of the flame which ejects from the transfer passage.

The above object is achieved by cavity and wall arangement wherein the major portion of a flame which ejects from a swirl chamber by way of a transfer passage, is subject to first and second deflections. The first occurs close to TDC, the second after the piston has decended a predetermined amount. A minor portion of the flame which tends to flow in a direction essentially the reverse of the main one, encounters a curved deflection wall portion located close to the perimeter of the piston and is thereafter subject to guidance by guide members which induce the flame to blend with the air located proximate the location the tranfer passage opens into the combustion chamber. A variation of the basic arrangement includes the provision of a squish generating projection which promotes suitable mixing turbulence near the curved deflection wall portion.

More specifically, a first aspect of the present invention is deemed to comprise an internal combustion engine which features: a piston reciprocatively disposed in a bore to define a variable volume combustion chamber; and a swirl chamber, said swirl chamber being fluidly communicated with the combustion chamber by a transfer passage, said piston comprising: an essentially flat crown; a shaped cavity formed in said crown, said cavity defining first and second shaped opposed wall portions; a first flame deflecting projection, said first flame deflecting projection comprising a member which is disposed in said cavity, said first flame deflecting projection being arranged to be in the path of the flame which ejects from said transfer passage during the expansion phase of the engine and when the piston is close to its TDC position; said first shaped wall being arranged to have first and second guide portions, said first and second guide portions extending essentially toward said first flame deflecting projection, said first wall further comprising a first curved section which merges with said first and second guide portions, said first curved section extending along the crown of said piston in a location which is proximate the mouth of said transfer port when the piston is close to TDC, said first and second guide portions and said first curved portion defining in part a first flame dispersing zone in said cavity, said first curved wall portion being so constructed and arranged as to deflect a portion of the flame which flows theretoward and which promotes mixing of the flame with the air contained in said first flame dispersing zone.

A second aspect of the present invention is deemed to come in an internal combustion engine which features: a piston reciprocatively disposed in a cylinder in a manner to define a variable volume main combustion chamber; a swirl chamber, said swirl chamber being fluidly communicated with said main combustion chamber by way of a transfer passage, said transfer passage being arranged to direct a flame produced by the combustion of an air-fuel mixture in the swirl chamber in a predetermined direction; means defining a first flame deflecting surface on the crown of said piston, said first flame deflecting surface being arranged to be located in the path of a major portion of said flame when said piston is close to its TDC position; means defining a second flame deflecting surface, said second flame deflecting surface being arranged in the path of said major portion of said flame when the piston has decended from its TDC position by more than a predetermined amount, said first and second flame deflecting surfaces being arranged to establish two swirling air gas patterns in the main combustion chamber; and means defining a third flame deflecting surface, said third flame deflecting surface being arranged to deflect a minor portion of the flame which is ejected from said transfer port and which flows in a direction which leads it away from said first and second flame deflecting surfaces, said third flame deflecting surface being arranged to deflect said minor portion of the flame in a manner which promotes the blending of the same with the air in said main combustion chamber and which is located in proximity of said third flame deflecting surface.

DESCRIPTION OF THE PREFERRED EMBODIMENTS

Figure 1:
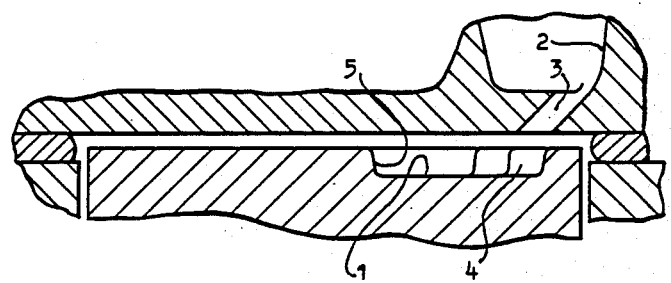
FIG. 1 is a sectional elevation of the prior art clover leaf type cavity arrangement discussed in the opening paragraphs of the instant disclosure.
Figure 2:
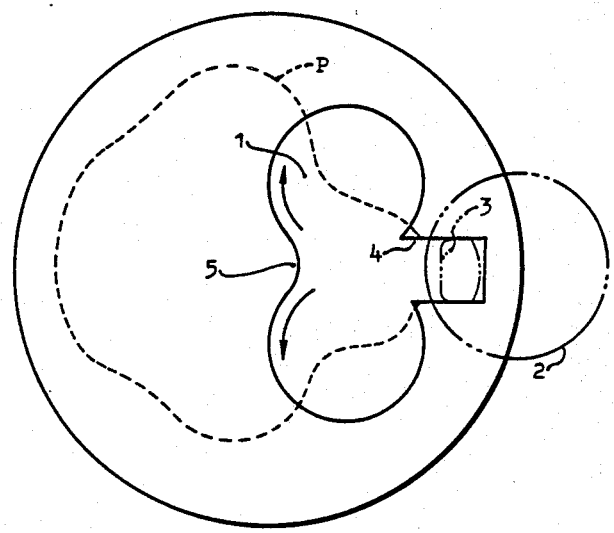
FIG. 2 is a plan view of the arrangement shown in FIG. 1.
Figure 3:
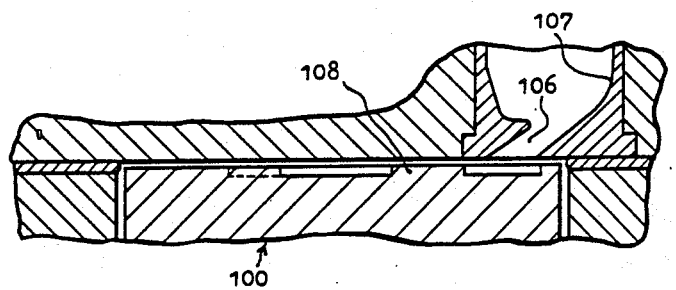
FIGS. 3 and 4 are sectional elevation and plan views showing a first embodiment of the present invention.
Figure 4:
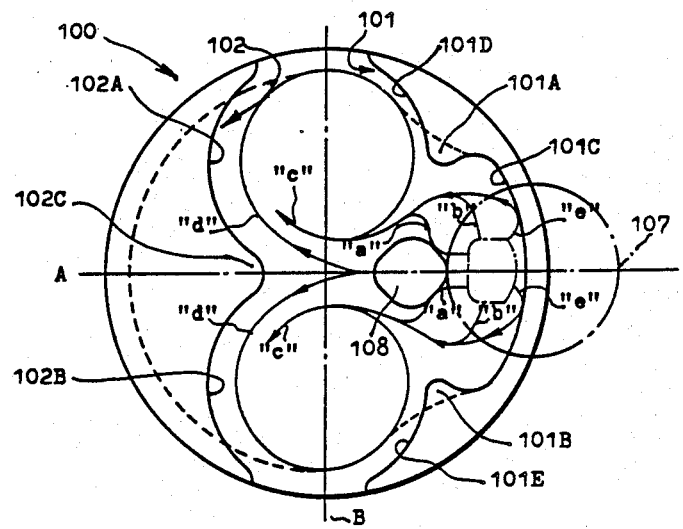

FIGS. 3 and 4 shown a first embodiment of the present invention. In this arrangement the piston 100 is formed with a shaped flame dispersing cavity in the crown thereof. The cavity is defined between two opposed shaped walls 101 and 102 and is relatively shallow as compared with the prior art arrangement shown in FIGS. 1 and 2 of the drawings, in order to prevent loss of compression.

To facilitate description of the configuration and arrangement of the various portions of this cavity, description will be given with reference to first and second lines A and B which extend along diameters of the piston, which are normal to one and other and which intersect at the center of the crown.

Portions of the first wall 101 which flank the mouth of a transfer passage 106 which leads from a swirl chamber 107 to the main combustion chamber, are arrange to define two essentially inwardly directed nose-like guide portions 101A and 101B and which define a first flame dispersion portion within the cavity. The wall portion 101C which extends between the two guide portions is arranged to have a curvature which essentially parallels the periphery of the piston 100. As will be noted the first flame dispersing zone has a bay-like configuration.

Curved wall portions 101D, 101E of the first wall and 102A and 102B of the second wall are arranged to define therebetween second and third dispersion portions or zones which have essentially circular shapes and which partially overlap one and other and the first dispersion portion, are such as to essentially symmetrically with respect to line A and essentially aligned along line B.

A single island-like deflection portion 108 is located amid the first, second and third flame dispersing zones. This element is arranged to project up from the floor of the cavity at a site which is located in the mouth of the bay-like first flame dispersing zone, and on the first line A and between the mouth of the transfer port 106 and the center of the piston 100.

The transfer passage 106 is oriented so that this deflection portion 108 is arranged to be in the path of the flame which is ejected therefrom during the initial stage of the expansion phase and while the piston 100 is still located relatively close to its TDC position.

The upstream side of the deflectio portion 108 is arranged to have angled (V shaped) sides which face into the path of the flame flow and which are designed to induce a first splitting or division of the same. The two sides of this portion 108 are arranged at a first angle.

A second flame splitting or deflecting portion is defined by a V shaped nose-like portion 102C which forms part of the second wall 102 and which projects into the cavity in a manner which tends to separate the second and third circular dispersion portions. The sides of this nose are arranged to define a second angle. In this instance, the first angle is preferably larger than the second one.

It will be noted that second and third zones of the cavity are open and extend to the very perimeter of the piston 100 in a manner as shown.

For disclosure relating this type of cavity wherein the essentially circular flame dispersing portions extend all the way to the periphery of the piston in a manner similar to the arrangement of the instant embodiment, reference may be had to copending U.S. Pat. No. 4,662,330 issued on May, 5, 1987 in the name of Giichi Shiyoyama et al. This reference discloses a cavity arrangement which reduces the adverse effect of flows created by a reverse squish phenomenon on the desired swirl patterns in the combustion chamber in the area of the flame dispersing portions which flank the trench portion, by permitting the reverse squish induced flows to encounter the bore wall. The content of this document is hereby incorporated by reference thereto.

The operation of the above disclosed arrangement is such that while the piston is close to its TDC position, the major portion of the flame which passes through the transfer port 106 during the expansion phase of the engine, flows toward and impinges the first deflecting portion 108 as shown by flow lines "a". This induces a first splitting or division of the flame which causes part thereof to curl outward and to encounter flows moving essentially as indicated by flow lines "b".

As will be appreciated the flow indicated by these lines has been deflected by the guide portions 101A and 110B. This combined flow tends to pass by the sides of the island-like first deflection portion 108 and thereafter establish swirling patterns in the second and third circular dispersion zones as indicated by flow lines "c".

Subsequently, as the piston 100 decends, the location or site where the flame from the transfer port 106 impinges on the piston crown travels from upstream of the first flame deflecting portion 108 toward the center of the piston and the second flame splitting portion 120. Thus, upon a given amount of decent of the piston 100 from its TDC position, the flame passes over the top of the first deflecting portion 108, and is subject to a second division by the second deflecting portion 102C. This second division produces swirling flows which blends into the previously established swirling patterns in the second and third dispersion zones, as a manner as indicated flow lines "d".

This dual stage splitting of the flame flow tends to produce as extensive well developed plume of the nature generally indicated in broken line and which engulfs a considerable volume of the air available in the main combustion chamber thus promoting complete and rapid combustion of the fraction of fuel which is permitted to enter thereinto prior the beginning of the expansion phase along with the uncombusted fraction which is entrained in the burning gases constituting the flame which ejects from the transfer port 106. This reduces HC emissions during low load operation and smoke formation under high loads.

In addition to this, and in accordance with a main feature of the instant invention, the portions of the flame which do no proceed directly toward the first flame deflecting portion 108 and which are permitted to flow essentially rearwardly toward the piston perimeter, tend to be deflected by the wall portion 101C as indicated by flow lines "e". The flow after being deflected tends to flow laterally outwardly in the direction of the guides 101A and 101B. The guides then subsequently induce the flows to curl inwardly and be caused to blend with the first and second ones denoted by the flow lines "a" and "b".

This promotes blending of the flames with the air which is contained in the first dispersion zone proximate the periphery of the piston and further improves the combustion characteristics to the degree that reductions in the amount of HC and smoke emitted from the engine are achieved.

It should be noted that it is within the scope of the present invention to form the piston and the elements which define the cavity integrally or alternatively form given parts of cermic material and the remainder of metal as deemed appropriate.

Figure 5:
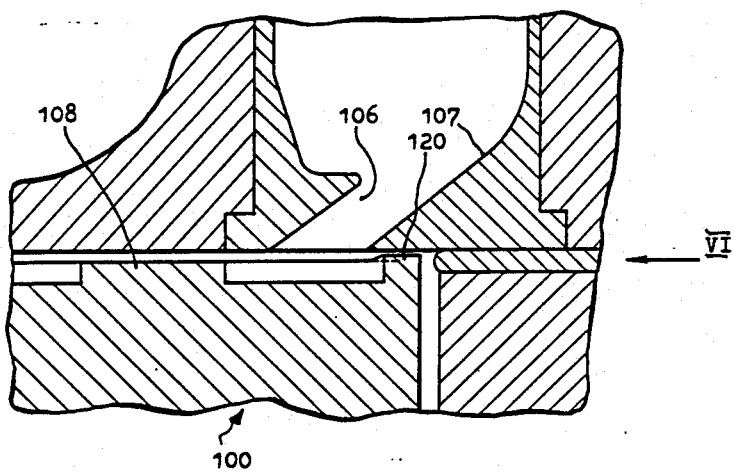
FIGS. 5 and 6 are sectional elevation and a plan views showing a second embodiment of the present invention.
Figure 6:
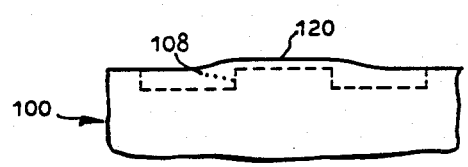

FIG. 5 and 6 show a second embodiment of the present invention. This embodiment is basically identical to the first and differs in that a squish generating arrangement is defined by an elevated periferal portion 120. As shown in FIG. 6 this elevated portion 120 is formed on the crown of the piston in a location immediately adjacent the downstream side of the transfer port mouth.

The elevated portion 120 is arranged to produce a small squish as the piston 100 assumes its TDC position and to subsequently produce a reverse squish as the piston begins to decent. This squishing action is such as to promote turbulence in the region where the flame tends to produce the least effect and thus increases the mixing effect in the section of the first dispersion zone upon the spontaneous combustion occuring the swirl chamber. In accordance with the second embodiment, in the event that the clearance between the top of the piston and the cylinder head is in the order of 0.6–0.7 mm, the elevated portion can be arranged to be project above the upper surface of the piston by approximately 0.2 mm. The elevated portion also increases the deflective capacity of the wall portion 101C during the initial decent of the piston 100.

What is claimed is:

1. In an internal combustion engine
a piston reciprocatively disposed in a bore to define a variable volume combustion chamber; and
a swirl chamber, said swirl chamber being fluidly communicated with the combustion chamber by a transfer passage, said piston comprising:
an essentially flat crown;
a shaped cavity formed in said crown, said cavity defining first and second shaped opposed wall portions;
a first flame deflecting projection, said first flame deflecting projection comprising a member which is disposed in said cavity, said first flame deflecting projection being arranged to be in the path of the flame which ejects from said transfer passage during the expansion phase of the engine and when the piston is close to its TDC position;
said first shaped wall being arranged to have first and second guide portions, said first and second guide portions extending essentially toward said first flame deflecting projection, said first wall further comprising a first curved section which merges with said first and second guide portions, said first curved section extending along the crown of said piston in a location which is proximate the mouth of said transfer port when the piston is close to TDC, said first and second guide portions and said first curved portion defining in part a first flame dispersing zone in said cavity, said first curved wall portion being so constructed and arranged as to deflect a portion of the flame which flows theretoward and which promotes mixing of the flame with the air contained in said first flame dispersing zone.

2. An internal combustion engine as claimed in claim 1 further comprising an elevated portion, said elevated portion extending above the level of said essentially flat piston crown in a manner to closely proximate the cylinder head of the engine when said piston assumes its TDC position, said elevated portion closely approaching the cylinder head to produce a squish effect which promotes turbulence in said first flame dispersing zone and which promotes the mixing of the flame and the air contained in said first flame dispersing zone.

3. An internal combustion engine as claimed in claim 1 further comprising:
second and third curved wall portions, said second and third curved wall portions being formed in said first wall, said first and second wall portions being formed in said first wall outboard of said first and second guide portions respectively;
fourth and fifth curved wall portions, said fourth and fifth wall portions being formed in said second wall, said fourth and fifth wall portions cooperating to define a nose portion which projects into said cavity, said nose portion being arranged in the path of the flame which ejects from said transfer passage after said piston decends from its TDC position by a predetermined amount, said fourth and fifth curved wall portions further cooperating with said said second and third curved wall portions in said first wall in a manner to define second and third essentially circular flame dispersing zones.

4. An internal combustion engine as claimed in claim 2 wherein said first and second walls each terminate at the periphery of said piston crown.

5. In an internal combustion engine
a piston reciprocatively disposed in a cylinder in a manner to define a variable volume main combustion chamber;
a swirl chamber, said swirl chamber being fluidly communicated with said main combustion chamber by way of a transfer passage, said transfer passage being arranged to direct a flame produced by the combustion of, an air-fuel mixture in the swirl chamber in a predetermined direction;
means defining a first flame deflecting surface on the crown of said piston, said first flame deflecting surface being arranged to be located in the path of a major portion of said flame when said piston is close to its TDC position;

means defining a second flame deflecting surface, said second flame deflecting surface being arranged in the path of said major portion of said flame when the piston has decended from its TDC position by more than a predetermined amount, said first and second flame deflecting surfaces being arranged to establish two swirling air gas patterns in the main combustion chamber, and means defining a third flame deflecting surface, said third flame deflecting surface being arranged to deflect a minor portion of the flame which is ejected from said transfer port and which flows in a direction which leads it away from said first and second flame deflecting surfaces, said third flame deflecting surface being arranged to deflect said minor portion of the flame in a manner which promotes the blending of the same with the air in said main combustion chamber and which is located in proximity of said third flame deflecting surface.

6. An internal combustion engine as claimed in claim 5 wherein said third flame deflecting surface is defined in a first shaped wall, said first shaped wall including first and second flame guide members and a first curved wall portion which extends between said first and second flame guides, said first curved wall portion being arranged to extend in close proximity to the periphery of said piston crown.

7. An internal combustion engine as claimed in claim 6 further comprising an elevated portion which is formed on said piston crown proximate said curved wall portion and the periphery of said piston, said elevated portion approaching the cylinder head more closely than the remaining portion of said piston crown when said piston assumes its TDC position.

8. An internal combustion engine as claimed in claim 7 wherein said elevated portion produces a squish effect which promotes turbulence in said first flame dispersion zone and the mixing of the air in said first flame dispersing zone with the flame which flows toward said first curve wall portion.

9. An internal combustin engine as claimed in claim 6 wherein said piston is formed with a cavity, said cavity being defined between said first shaped wall and a second shaped wall located opposite said first shaped wall, said second shaped wall comprising a nose-like projection portion which defines said second flame deflecting surface.

10. An internal combustion engine as claimed in claim 6 wherein said first flame deflecting surface is defined by a projection which is located in said cavity and arranged between said first and second shaped walls, said first and second flame deflecting surfaces being arranged to be alinged with respect to the path followed by said main portion of the flame.

11. An internal combustion engine as claimed in claim 6 wherein said first and second guide members and said first curved wall section define a first bay-like flame dispersion zone, said projection defining said first flame deflecting surface being located proximate the mouth of said bay-like flame dispersing zone.

12. An internal combustion engine as claimed in claim 6 wherein said first shaped wall portion further includes second and third curved wall portions and said second shaped wall further includes fourth and fifth curved wall portions which cooperate with said second and third curved wall portions in a manner to define second and third essentially circular flame dispersing zones.

* * * * *